US009048936B2

(12) United States Patent
Vermani et al.

(10) Patent No.: US 9,048,936 B2
(45) Date of Patent: Jun. 2, 2015

(54) SYSTEMS AND METHODS FOR MANAGING ON-TIME OF WIRELESS RECEIVERS

(71) Applicant: QUALCOMM Incorporated, San Diego, CA (US)

(72) Inventors: Sameer Vermani, San Diego, CA (US); Lin Yang, San Diego, CA (US); Eugene J. Baik, San Diego, CA (US); Hemanth Sampath, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 25 days.

(21) Appl. No.: 13/729,785

(22) Filed: Dec. 28, 2012

(65) Prior Publication Data

US 2013/0170523 A1    Jul. 4, 2013

Related U.S. Application Data

(60) Provisional application No. 61/582,433, filed on Jan. 2, 2012.

(51) Int. Cl.
*H04B 1/00* (2006.01)
*H04B 1/707* (2011.01)
*H04L 27/26* (2006.01)
*H04L 25/02* (2006.01)
*H04B 1/7075* (2011.01)

(52) U.S. Cl.
CPC .............. *H04B 1/707* (2013.01); *H04B 1/7075* (2013.01); *H04L 27/2602* (2013.01); *H04L 25/0226* (2013.01)

(58) Field of Classification Search
CPC .............................. H04B 1/707; H04B 1/7075

USPC .......................................................... 375/141
See application file for complete search history.

(56) References Cited

U.S. PATENT DOCUMENTS

| 5,712,869 | A  | * | 1/1998 | Lee et al. ..................... 375/141 |
| 7,558,293 | B2 | * | 7/2009 | Choi et al. ................... 370/509 |
| 7,680,090 | B2 |   | 3/2010 | Welborn |
| 7,869,488 | B2 |   | 1/2011 | Zhang |

(Continued)

FOREIGN PATENT DOCUMENTS

WO    2011019968    2/2011

OTHER PUBLICATIONS

International Search Report and Written Opinion—PCT/US2013/000007—ISA/EPO—Jun. 3, 2013.

*Primary Examiner* — Santiago Garcia
(74) *Attorney, Agent, or Firm* — James K. O'Hare

(57) ABSTRACT

Systems, methods, and devices for communicating in a wireless network are described herein. In an aspect, a method of transmitting a data unit includes generating a data unit. The data unit includes one or more short training field (STF) sequences. The method further includes encoding each of the STF sequences with a pseudo-random spreading code. The code is based on an addressee of the data unit. The method further includes transmitting, at a transmitter, the data unit over a wireless channel. In another aspect, a method of processing a data unit includes receiving, at a receiver, a data unit. The data unit includes one or more STF sequences. The method further includes determining whether the data unit comprises one or more differentially encoded symbols. The method further includes receiving one or more long training field (LTF) sequences when the data unit does not comprise one or more differentially encoded symbols.

47 Claims, 8 Drawing Sheets

(56) References Cited

U.S. PATENT DOCUMENTS

| | | | |
|---|---|---|---|
| 8,493,837 B2* | 7/2013 | Lee et al. | 370/208 |
| 2005/0013238 A1* | 1/2005 | Hansen | 370/203 |
| 2006/0045003 A1* | 3/2006 | Choi et al. | 370/208 |
| 2007/0195734 A1* | 8/2007 | Das et al. | 370/335 |
| 2009/0285339 A1* | 11/2009 | Zhang et al. | 375/343 |
| 2011/0013532 A1* | 1/2011 | Wu et al. | 370/252 |
| 2011/0128869 A1 | 6/2011 | Coleri Ergen et al. | |
| 2011/0134818 A1 | 6/2011 | Bae et al. | |
| 2011/0182223 A1 | 7/2011 | Patel et al. | |
| 2011/0188482 A1 | 8/2011 | Vermani et al. | |
| 2013/0322338 A1* | 12/2013 | Das et al. | 370/328 |

* cited by examiner

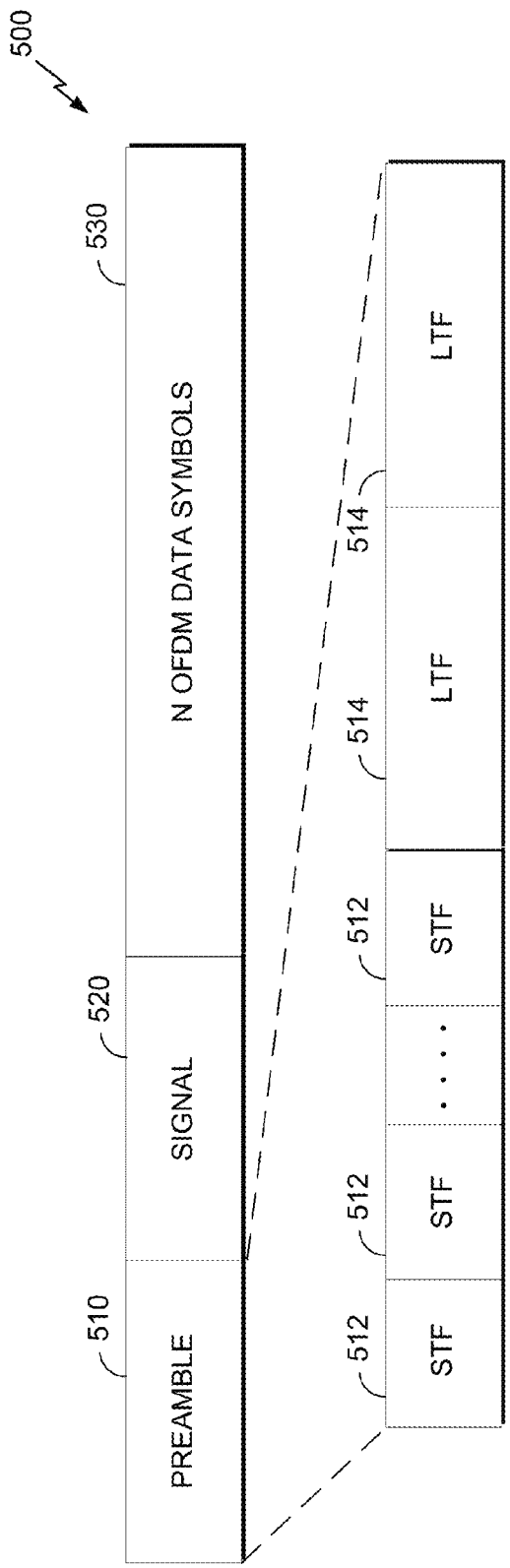
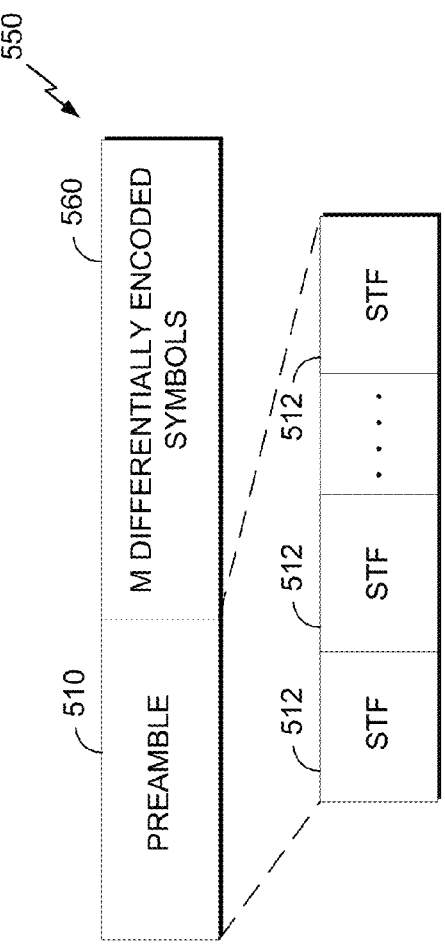
FIG. 5A
FIG. 5B

SYSTEMS AND METHODS FOR MANAGING ON-TIME OF WIRELESS RECEIVERS

BACKGROUND

1. Field

The present application relates generally to wireless communications, and more specifically to systems, methods, and devices for managing the state of wireless receivers. Certain aspects herein relate to determining when the wireless receiver can shut off or transition to a low-power mode. Other aspects herein relate to transmitting and receiving packets having short preambles.

2. Background

In many telecommunication systems, communications networks are used to exchange messages among several interacting spatially-separated devices. Networks can be classified according to geographic scope, which could be, for example, a metropolitan area, a local area, or a personal area. Such networks would be designated respectively as a wide area network (WAN), metropolitan area network (MAN), local area network (LAN), or personal area network (PAN). Networks also differ according to the switching/routing technique used to interconnect the various network nodes and devices (e.g., circuit switching vs. packet switching), the type of physical media employed for transmission (e.g., wired vs. wireless), and the set of communication protocols used (e.g., Internet protocol suite, SONET (Synchronous Optical Networking), Ethernet, etc.).

Wireless networks are often preferred when the network elements are mobile and thus have dynamic connectivity needs, or if the network architecture is formed in an ad hoc, rather than fixed, topology. Wireless networks employ intangible physical media in an unguided propagation mode using electromagnetic waves in the radio, microwave, infra-red, optical, etc. frequency bands. Wireless networks advantageously facilitate user mobility and rapid field deployment when compared to fixed wired networks.

The devices in a wireless network can transmit/receive information between each other. The information can include packets, which in some aspects can be referred to as data units. The packets can include overhead information (e.g., header information, packet properties, etc.) that helps in routing the packet through the network, identifying the data in the packet, processing the packet, etc., as well as data, for example user data, multimedia content, etc. as might be carried in a payload of the packet.

SUMMARY

The systems, methods, and devices of the invention each have several aspects, no single one of which is solely responsible for its desirable attributes. Without limiting the scope of this invention as expressed by the claims which follow, some features will now be discussed briefly. After considering this discussion, and particularly after reading the section entitled "Detailed Description" one will understand how the features of this invention provide advantages that include decreasing the amount of time a receiver spends in a high-power state.

One aspect of the disclosure provides a method of wireless communication. The method includes generating a data unit. The data unit includes one or more short training field (STF) sequences. The method further includes encoding each of the STF sequences with a pseudo-random spreading code based on an addressee of the data unit. The method further includes transmitting, at a transmitter, the data unit over a wireless channel.

Another aspect of the disclosure provides a method of wireless communication. The method includes receiving, at a receiver, at least a portion of a data unit. The data unit includes one or more short training field (STF) sequences. The one or more STF sequences are encoded with a pseudo-random spreading code based on an addressee of a data unit. The method further includes determining whether the pseudo-random spreading code is associated with the receiver. The method further includes refraining from decoding a portion of the data unit when the pseudo-random spreading code is not associated with the receiver.

Another aspect of the disclosure provides a method of wireless communication. The method includes generating a data unit. The data unit includes one or more short training field (STF) sequences and one or more differentially encoded symbols. The method further includes transmitting, at a transmitter, the data unit over a wireless channel.

Another aspect of the disclosure provides a method of wireless communication. The method includes receiving, at a receiver, a data unit. The data unit includes one or more short training field (STF) sequences. The method further includes determining whether the data unit includes one or more differentially encoded symbols. The method further includes receiving one or more long training field (LTF) sequences when the data unit does not include one or more differentially encoded symbols.

Another aspect of the disclosure provides a wireless device. The device includes a processor configured to generate a data unit. The data unit includes one or more short training field (STF) sequences. The processor is further configured to encode each of the STF sequences with a pseudo-random spreading code based on an addressee of the data unit. The device further includes a transmitter configured to transmit the data unit over a wireless channel.

Another aspect of the disclosure provides a wireless device. The device includes a receiver configured to receive at least a portion of a data unit. The data unit includes one or more short training field (STF) sequences. The one or more STF sequences are encoded with a pseudo-random spreading code based on an addressee of a data unit. The device further includes a processor configured to determine whether the pseudo-random spreading code is associated with the receiver. The processor is further configured to refrain from decoding a portion of the data unit when the pseudo-random spreading code is not associated with the receiver.

Another aspect of the disclosure provides a wireless device. The device includes a processor configured to generate a data unit. The data unit includes one or more short training field (STF) sequences and one or more differentially encoded symbols. The device further includes a transmitter configured to transmit the data unit over a wireless channel.

Another aspect of the disclosure provides a wireless device. The device includes a receiver configured to receive at least a portion of a data unit. The data unit includes one or more short training field (STF) sequences. The device further includes a processor configured to determine whether the data unit includes one or more differentially encoded symbols. The receiver is further configured to receive one or more long training field (LTF) sequences when the data unit does not include one or more differentially encoded symbols.

Another aspect of the disclosure provides an apparatus for wireless communication. The apparatus includes processing means for generating a data unit. The data unit includes one or more short training field (STF) sequences. The processing means is also for encoding each of the STF sequences with a pseudo-random spreading code based on an addressee of the data unit. The apparatus further includes transmitting means for transmitting the data unit over a wireless channel.

Another aspect of the disclosure provides an apparatus for wireless communication. The apparatus includes receiving means for receiving at least a portion of a data unit. The data unit includes one or more short training field (STF) sequences. The one or more STF sequences are encoded with a pseudo-random spreading code based on an addressee of a data unit. The apparatus further includes processing means for determining whether the pseudo-random spreading code is associated with the receiver. The processing means is further for refraining from decoding a portion of the data unit when the pseudo-random spreading code is not associated with the receiver.

Another aspect of the disclosure provides an apparatus for wireless communication. The apparatus includes processing means for generating a data unit. The data unit includes one or more short training field (STF) sequences. The device further includes transmitting means for transmitting the data unit over a wireless channel.

Another aspect of the disclosure provides an apparatus for wireless communication. The apparatus includes receiving means for receiving at least a portion of a data unit. The data unit includes one or more short training field (STF) sequences. The apparatus further includes processing means for determining whether the data unit includes one or more differentially encoded symbols. The receiving means is further for receiving one or more long training field (LTF) sequences when the data unit does not include one or more differentially encoded symbols.

Another aspect of the disclosure provides a non-transitory computer-readable medium including code that, when executed, causes an apparatus to generate a data unit. The data unit includes one or more short training field (STF) sequences. The medium further includes code that, when executed, causes the apparatus to encode each of the STF sequences with a pseudo-random spreading code based on an addressee of the data unit. The medium further includes code that, when executed, causes the apparatus to transmit the data unit over a wireless channel.

Another aspect of the disclosure provides a non-transitory computer-readable medium including code that, when executed, causes an apparatus receive at least a portion of a data unit. The data unit includes one or more short training field (STF) sequences. The one or more STF sequences are encoded with a pseudo-random spreading code based on an addressee of a data unit. The medium further includes code that, when executed, causes the apparatus to determine whether the pseudo-random spreading code is associated with the apparatus. The medium further includes code that, when executed, causes the apparatus to refrain from decoding a portion of the data unit when the pseudo-random spreading code is not associated with the apparatus.

Another aspect of the disclosure provides a non-transitory computer-readable medium including code that, when executed, causes an apparatus to generate a data unit. The data unit includes one or more short training field (STF) sequences and one or more differentially encoded symbols. The medium further includes code that, when executed, causes the apparatus to transmit the data unit over a wireless channel.

Another aspect of the disclosure provides a non-transitory computer-readable medium including code that, when executed, causes an apparatus to receive a data unit. The data unit includes one or more short training field (STF) sequences. The medium further includes code that, when executed, causes the apparatus to determine whether the data unit includes one or more differentially encoded symbols. The medium further includes code that, when executed, causes the apparatus to receive one or more long training field (LTF) sequences when the data unit does not include one or more differentially encoded symbols.

BRIEF DESCRIPTION OF THE DRAWINGS

FIG. 5A illustrates an example of a data unit.

FIG. 5B illustrates an example of another data unit.

DETAILED DESCRIPTION

Figure 1:
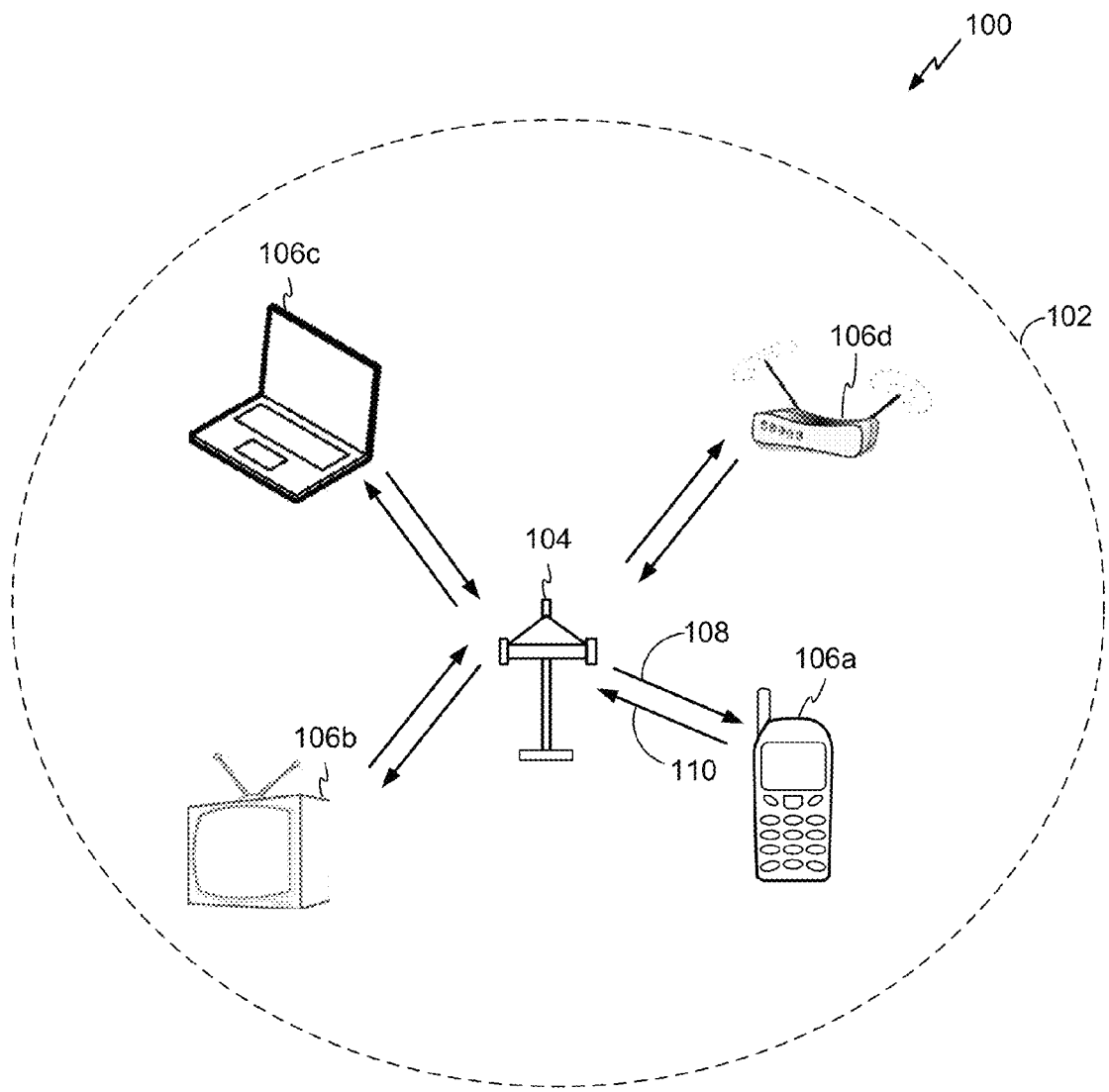
FIG. 1 illustrates an example of a wireless communication system in which aspects of the present disclosure can be employed.

Various aspects of the novel systems, apparatuses, and methods are described more fully hereinafter with reference to the accompanying drawings. The teachings disclosure can, however, be embodied in many different forms and should not be construed as limited to any specific structure or function presented throughout this disclosure. Rather, these aspects are provided so that this disclosure will be thorough and complete, and will fully convey the scope of the disclosure to those skilled in the art. Based on the teachings herein one skilled in the art should appreciate that the scope of the disclosure is intended to cover any aspect of the novel systems, apparatuses, and methods disclosed herein, whether implemented independently of or combined with any other aspect of the invention. For example, an apparatus can be implemented or a method can be practiced using any number of the aspects set forth herein. In addition, the scope of the invention is intended to cover such an apparatus or method which is practiced using other structure, functionality, or structure and functionality in addition to or other than the various aspects of the invention set forth herein. It should be understood that any aspect disclosed herein can be embodied by one or more elements of a claim.

Although particular aspects are described herein, many variations and permutations of these aspects fall within the scope of the disclosure. Although some benefits and advantages of the preferred aspects are mentioned, the scope of the disclosure is not intended to be limited to particular benefits, uses, or objectives. Rather, aspects of the disclosure are intended to be broadly applicable to different wireless technologies, system configurations, networks, and transmission protocols, some of which are illustrated by way of example in the figures and in the following description of the preferred aspects. The detailed description and drawings are merely illustrative of the disclosure rather than limiting, the scope of the disclosure being defined by the appended claims and equivalents thereof.

Wireless network technologies can include various types of wireless local area networks (WLANs). A WLAN can be used to interconnect nearby devices together, employing widely used networking protocols. The various aspects described herein can apply to any communication standard, such as WiFi or, more generally, any member of the IEEE 802.11 family of wireless protocols. For example, the various aspects described herein can be used as part of the IEEE 802.11ah protocol, which uses sub-1 GHz bands.

In some aspects, wireless signals in a sub-gigahertz band can be transmitted according to the 802.11ah protocol using orthogonal frequency-division multiplexing (OFDM), direct-sequence spread spectrum (DSSS) communications, a combination of OFDM and DSSS communications, or other schemes. Implementations of the 802.11ah protocol can be used for sensors, metering, and smart grid networks. Advantageously, aspects of certain devices implementing the 802.11ah protocol can consume less power than devices implementing other wireless protocols, and/or can be used to transmit wireless signals across a relatively long range, for example about one kilometer or longer.

In some implementations, a WLAN includes various devices which are the components that access the wireless network. For example, there can be two types of devices: access points ("APs") and clients (also referred to as stations, or "STAB"). In general, an AP serves as a hub or base station for the WLAN and an STA serves as a user of the WLAN. For example, an STA can be a laptop computer, a personal digital assistant (PDA), a mobile phone, etc. In an example, an STA connects to an AP via a WiFi (e.g., IEEE 802.11 protocol such as 802.11ah) compliant wireless link to obtain general connectivity to the Internet or to other wide area networks. In some implementations an STA can also be used as an AP.

An access point ("AP") can also include, be implemented as, or known as a NodeB, Radio Network Controller ("RNC"), eNodeB, Base Station Controller ("BSC"), Base Transceiver Station ("BTS"), Base Station ("BS"), Transceiver Function ("TF"), Radio Router, Radio Transceiver, or some other terminology.

A station "STA" can also include, be implemented as, or known as an access terminal ("AT"), a subscriber station, a subscriber unit, a mobile station, a remote station, a remote terminal, a user terminal, a user agent, a user device, user equipment, or some other terminology. In some implementations an access terminal can include a cellular telephone, a cordless telephone, a Session Initiation Protocol ("SIP") phone, a wireless local loop ("WLL") station, a personal digital assistant ("PDA"), a handheld device having wireless connection capability, or some other suitable processing device connected to a wireless modem. Accordingly, one or more aspects taught herein can be incorporated into a phone (e.g., a cellular phone or smartphone), a computer (e.g., a laptop), a portable communication device, a headset, a portable computing device (e.g., a personal data assistant), an entertainment device (e.g., a music or video device, or a satellite radio), a gaming device or system, a global positioning system device, or any other suitable device that is configured to communicate via a wireless medium.

As discussed above, certain of the devices described herein can implement the 802.11ah standard, for example. Such devices, whether used as an STA or AP or other device, can be used for smart metering or in a smart grid network. Such devices can provide sensor applications or be used in home automation. The devices can instead or in addition be used in a healthcare context, for example for personal healthcare. They can also be used for surveillance, to enable extended-range Internet connectivity (e.g., for use with hotspots), or to implement machine-to-machine communications.

FIG. 1 illustrates an example of a wireless communication system 100 in which aspects of the present disclosure can be employed. The wireless communication system 100 can operate pursuant to a wireless standard, for example the 802.11ah standard. The wireless communication system 100 can include an AP 104, which communicates with STAs 106.

A variety of processes and methods can be used for transmissions in the wireless communication system 100 between the AP 104 and the STAs 106. For example, signals can be sent and received between the AP 104 and the STAs 106 in accordance with OFDM/OFDMA techniques. If this is the case, the wireless communication system 100 can be referred to as an OFDM/OFDMA system. Alternatively, signals can be sent and received between the AP 104 and the STAs 106 in accordance with CDMA techniques. If this is the case, the wireless communication system 100 can be referred to as a CDMA system.

A communication link that facilitates transmission from the AP 104 to one or more of the STAs 106 can be referred to as a downlink (DL) 108, and a communication link that facilitates transmission from one or more of the STAs 106 to the AP 104 can be referred to as an uplink (UL) 110. Alternatively, a downlink 108 can be referred to as a forward link or a forward channel, and an uplink 110 can be referred to as a reverse link or a reverse channel.

The AP 104 can act as a base station and provide wireless communication coverage in a basic service area (BSA) 102. The AP 104 along with the STAs 106 associated with the AP 104 and that use the AP 104 for communication can be referred to as a basic service set (BSS). It should be noted that the wireless communication system 100 may not have a central AP 104, but rather can function as a peer-to-peer network between the STAs 106. Accordingly, the functions of the AP 104 described herein can alternatively be performed by one or more of the STAs 106.

In various embodiments, the STAs 106 can be low-power devices, such as networked sensors with limited access to power. For example, the STAs 106 can be battery-powered devices. In various embodiments, the AP 104 can transmit packets encoded such that the STAs 106 can quickly determine when they are not the addressee of a packet. When the STAs 106 determine that they are not the addressee of a packet, they can stop decoding the packet, shut down one or more components (such as a receiver, for example), and/or enter a low-power state. When in the low-power state, the STAs 106 can consume less power than when determining whether they are the addressee of a packet. In an embodiment, the AP 104 can transmit packets having various preamble lengths depending on a packet type. When the STAs 106 receive packets having a short preamble length, they can transition to the low-power state sooner, having received the packet in less time.

Figure 2:
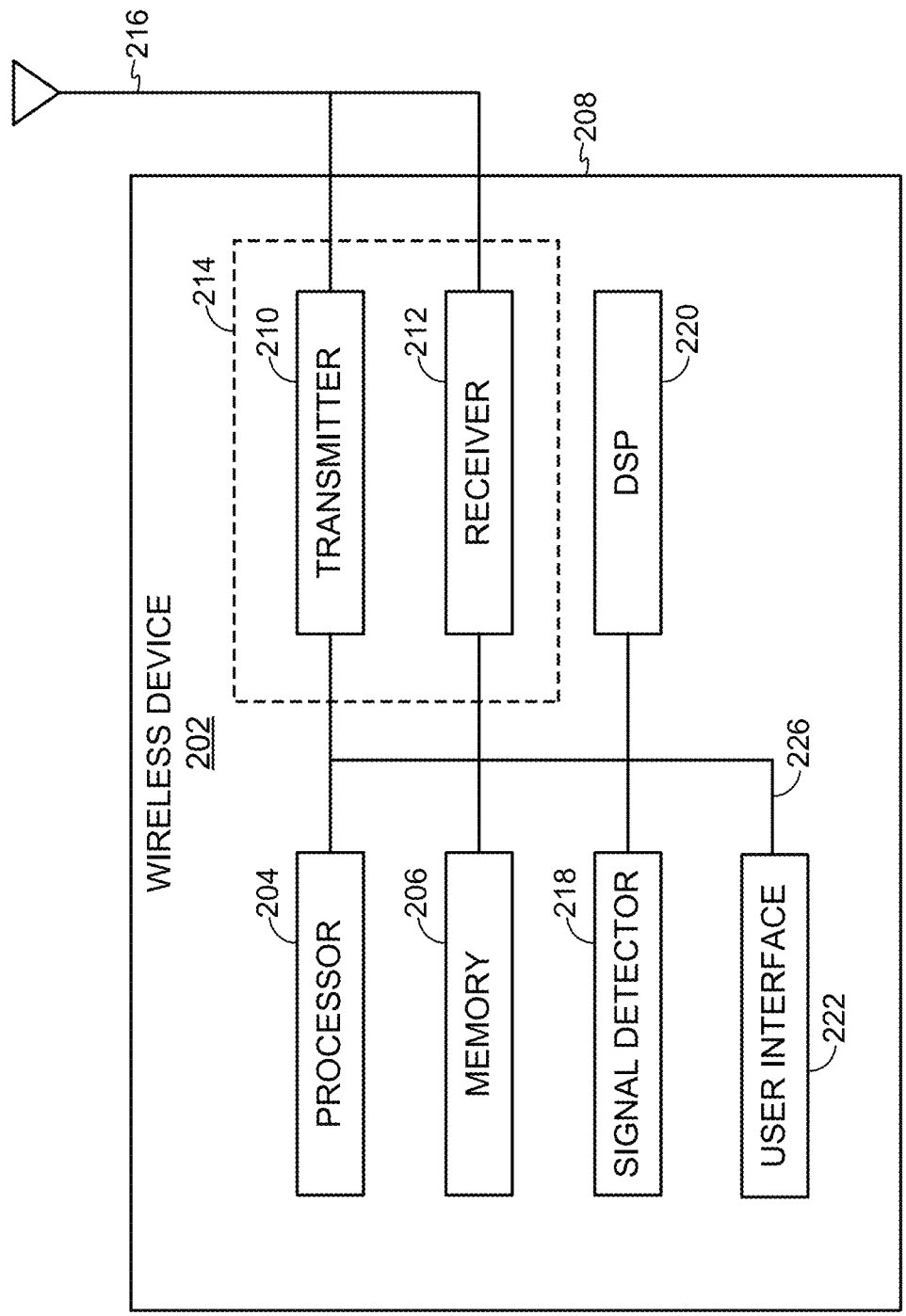
FIG. 2 shows a functional block diagram of an exemplary wireless device that can be employed within the wireless communication system of FIG. 1.

FIG. 2 illustrates various components that can be utilized in a wireless device 202 that can be employed within the wireless communication system 100. The wireless device 202 is an example of a device that can be configured to implement the various methods described herein. For example, the wireless device 202 can include the AP 104 or one of the STAs 106.

The wireless device 202 can include a processor 204 which controls operation of the wireless device 202. The processor 204 can also be referred to as a central processing unit (CPU). Memory 206, which can include both read-only memory (ROM) and random access memory (RAM), provides instructions and data to the processor 204. A portion of the memory 206 can also include non-volatile random access memory (NVRAM). The processor 204 typically performs logical and arithmetic operations based on program instructions stored within the memory 206. The instructions in the memory 206 can be executable to implement the methods described herein.

The processor 204 can include or be a component of a processing system implemented with one or more processors. The one or more processors can be implemented with any combination of general-purpose microprocessors, microcontrollers, digital signal processors (DSPs), field programmable gate array (FPGAs), programmable logic devices (PLDs), controllers, state machines, gated logic, discrete hardware components, dedicated hardware finite state machines, or any other suitable entities that can perform calculations or other manipulations of information.

The processing system can also include machine-readable media for storing software. Software shall be construed broadly to mean any type of instructions, whether referred to as software, firmware, middleware, microcode, hardware description language, or otherwise. Instructions can include code (e.g., in source code format, binary code format, executable code format, or any other suitable format of code). The instructions, when executed by the one or more processors, cause the processing system to perform the various functions described herein.

The wireless device 202 can also include a housing 208 that can include a transmitter 210 and a receiver 212 to allow transmission and reception of data between the wireless device 202 and a remote location. The transmitter 210 and the receiver 212 can be configured to operate in one or more power states. For example, the receiver 212 can be configured to operate in a relatively high-power state when initially receiving a packet. If the wireless device 202 determines that it is not the addressee of the packet, the receiver 212 can transition to a relatively low-power state. The transmitter 210 and receiver 212 can be combined into a transceiver 214. An antenna 216 can be attached to the housing 208 and electrically coupled to the transceiver 214. The wireless device 202 can also include (not shown) multiple transmitters, multiple receivers, multiple transceivers, and/or multiple antennas.

The wireless device 202 can also include a signal detector 218 that can be used in an effort to detect and quantify the level of signals received by the transceiver 214. The signal detector 218 can detect such signals as total energy, energy per subcarrier per symbol, power spectral density and other signals. The wireless device 202 can also include a digital signal processor (DSP) 220 for use in processing signals. The DSP 220 can be configured to generate a data unit for transmission. In some aspects, the data unit can include a physical layer data unit (PPDU). In some aspects, the PPDU is referred to as a packet.

The wireless device 202 can further include a user interface 222 in some aspects. The user interface 222 can include a keypad, a microphone, a speaker, and/or a display. The user interface 222 can include any element or component that conveys information to a user of the wireless device 202 and/or receives input from the user.

The various components of the wireless device 202 can be coupled together by a bus system 226. The bus system 226 can include a data bus, for example, as well as a power bus, a control signal bus, and a status signal bus in addition to the data bus. Those of skill in the art will appreciate the components of the wireless device 202 can be coupled together or accept or provide inputs to each other using some other mechanism.

Although a number of separate components are illustrated in FIG. 2, those of skill in the art will recognize that one or more of the components can be combined or commonly implemented. For example, the processor 204 can be used to implement not only the functionality described above with respect to the processor 204, but also to implement the functionality described above with respect to the signal detector 218 and/or the DSP 220. Further, each of the components illustrated in FIG. 2 can be implemented using a plurality of separate elements.

Figure 3:
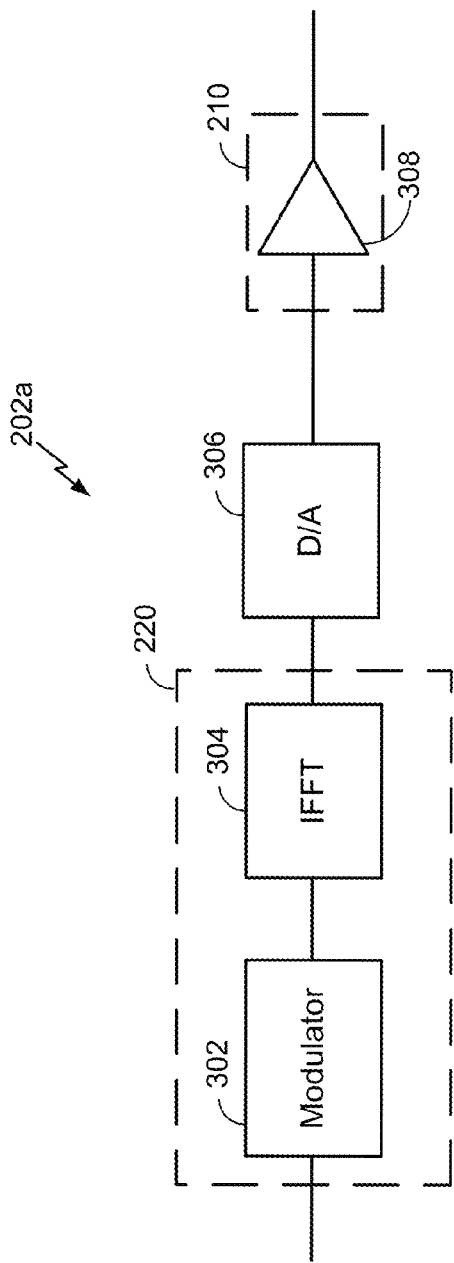
FIG. 3 shows a functional block diagram of exemplary components that can be utilized in the wireless device of FIG. 2 to transmit wireless communications.

FIG. 3 shows a functional block diagram of exemplary components that can be utilized in the wireless device 202 of FIG. 2 to transmit wireless communications. As discussed above, the wireless device 202 can include an AP 104 or an STA 106, and can be used to transmit and/or receive communications. The components illustrated in FIG. 3 can be used, for example, to transmit OFDM communications. For ease of reference, the wireless device 202 configured with the components illustrated in FIG. 3 is hereinafter referred to as a wireless device 202a.

The wireless device 202a can include a modulator 302 configured to modulate bits for transmission. For example, the modulator 302 can determine a plurality of symbols from bits received from the processor 204 or the user interface 222, for example by mapping bits to a plurality of symbols according to a constellation. The bits can correspond to user data or to control information. In some aspects, the bits are received in codewords. In one aspect, the modulator 302 includes a QAM (quadrature amplitude modulation) modulator, for example a 16-QAM modulator or a 64-QAM modulator. In other aspects, the modulator 302 includes a binary phase-shift keying (BPSK) modulator or a quadrature phase-shift keying (QPSK) modulator.

The wireless device 202a can further include a transform module 304 configured to convert symbols or otherwise modulated bits from the modulator 302 into a time domain. In FIG. 3, the transform module 304 is illustrated as being implemented by an inverse fast Fourier transform (IFFT) module. In some implementations, there can be multiple transform modules (not shown) that transform units of data of different sizes.

In FIG. 3, the modulator 302 and the transform module 304 are illustrated as being implemented in the DSP 220. In some aspects, however, one or both of the modulator 302 and the transform module 304 are implemented in the processor 204 or in another element of the wireless device 202.

As discussed above, the DSP 220 can be configured to generate a data unit for transmission. In some aspects, the modulator 302 and the transform module 304 can be configured to generate a data unit including a plurality of fields including control information and a plurality of data symbols. The fields including the control information can include one or more training fields, for example, and one or more signal (SIG) fields. Each of the training fields can include a known sequence of bits or symbols. Each of the SIG fields can include information about the data unit, for example a description of a length or data rate of the data unit.

In an embodiment, the DSP 220 can be configured to multiply a portion of the data unit in the time domain by a pseudo-random code. In various embodiments, the pseudo-random code can include, for example, a Hadamard or Walsh code. In an embodiment, the portion of the data unit DSP 220 multiplies the STF by the pseudo-random code. In an embodiment, the pseudo-random code can indicate a code index. The code index can indicate an addressee of the data unit. In an embodiment, the code index can indicate a group of devices of which the addressee of the data unit is a member.

In another embodiment, the DSP 220 can be configured to selectively encode a portion of the data unit differentially. For example, the DSP 220 can encode a portion of one or more control packets (such as ACK packets) differentially. In an embodiment, the DSP 220 can differentially encode one or more symbols of data following the STF for certain packet types such as control packets. As used herein, "differentially encoded packet" includes packets that include one or more differentially encoded portions, although the entire packet need not be differentially encoded.

In an embodiment, the wireless device 202a can be configured as an AP 104. The wireless device 202a can receive a first probe packet from a STA 106. The wireless device 202a can be configured to transmit a differentially encoded packet to the STA 106 in response to the first probe packet.

Returning to the description of FIG. 3, the wireless device 202a can further include a digital to analog converter (DAC) 306 configured to convert the output of the transform module into an analog signal. For example, the time-domain output of the transform module 306 can be converted to a baseband OFDM signal by the digital to analog converter 306. The digital to analog converter 306 can be implemented in the processor 204 or in another element of the wireless device 202. In some aspects, the digital to analog converter 306 is implemented in the transceiver 214 or in a data transmit processor.

The analog signal can be wirelessly transmitted by the transmitter 210. The analog signal can be further processed before being transmitted by the transmitter 210, for example by being filtered or by being upconverted to an intermediate or carrier frequency. In the aspect illustrated in FIG. 3, the transmitter 210 includes a transmit amplifier 308. Prior to being transmitted, the analog signal can be amplified by the transmit amplifier 308. In some aspects, the amplifier 308 includes a low noise amplifier (LNA).

The transmitter 210 is configured to transmit one or more packets or data units in a wireless signal based on the analog signal. The data units can be generated using the processor 204 and/or the DSP 220, for example using the modulator 302 and the transform module 304 as discussed above. Data units that can be generated and transmitted as discussed above are described in additional detail below with respect to FIGS. 5A and 5B.

Figure 4:
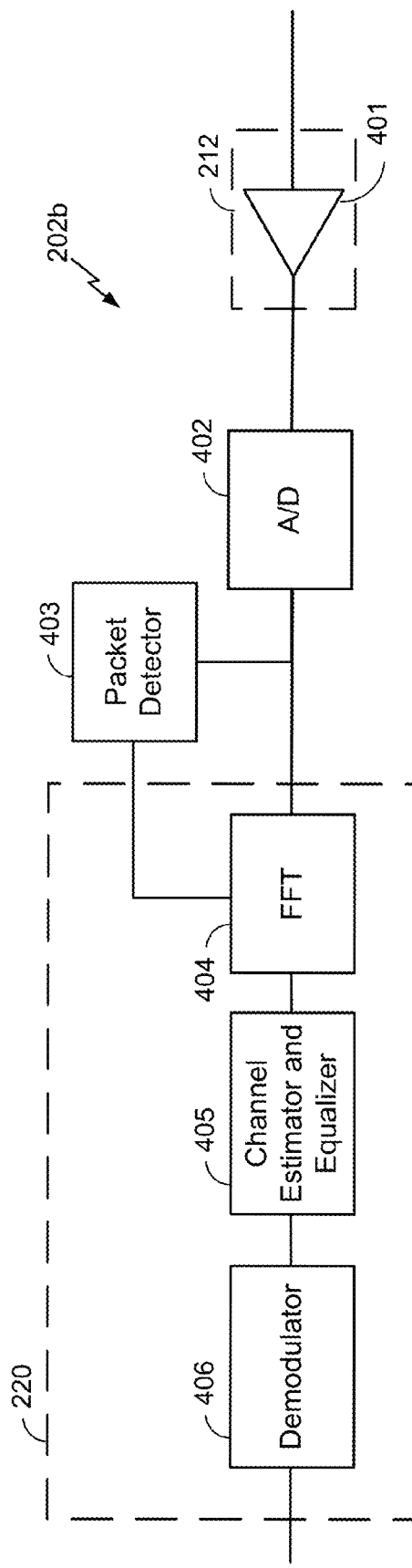
FIG. 4 shows a functional block diagram of exemplary components that can be utilized in the wireless device of FIG. 2 to receive wireless communications.

FIG. 4 shows a functional block diagram of exemplary components that can be utilized in the wireless device 202 of FIG. 2 to receive wireless communications. The components illustrated in FIG. 4 can be used, for example, to receive OFDM communications. In some aspects, the components illustrated in FIG. 4 are used to receive data units that include one or more training fields, as will be discussed in additional detail below. For example, the components illustrated in FIG. 4 can be used to receive data units transmitted by the components discussed above with respect to FIG. 3. For ease of reference, the wireless device 202 configured with the components illustrated in FIG. 4 is hereinafter referred to as a wireless device 202b.

The receiver 212 is configured to receive one or more packets or data units in a wireless signal. Data units that can be received and decoded or otherwise processed as discussed below are described in additional detail with respect to FIGS. 5A and 5B.

In the aspect illustrated in FIG. 4, the receiver 212 includes a receive amplifier 401. The receive amplifier 401 can be configured to amplify the wireless signal received by the receiver 212. In some aspects, the receiver 212 is configured to adjust the gain of the receive amplifier 401 using an automatic gain control (AGC) procedure. In some aspects, the automatic gain control uses information in one or more received training fields, such as a received short training field (STF) for example, to adjust the gain. Those having ordinary skill in the art will understand methods for performing AGC. In some aspects, the amplifier 401 includes an LNA.

The wireless device 202b can include an analog to digital converter 402 configured to convert the amplified wireless signal from the receiver 212 into a digital representation thereof. Further to being amplified, the wireless signal can be processed before being converted by the digital to analog converter 402, for example by being filtered or by being downconverted to an intermediate or baseband frequency. The analog to digital converter 402 can be implemented in the processor 204 or in another element of the wireless device 202. In some aspects, the analog to digital converter 402 is implemented in the transceiver 214 or in a data receive processor.

The wireless device 202b can further include a packet detector 403 configured to detect an incoming packet. The packet detector 403 can detect an incoming packet based on information in the STF. In an aspect, the packet detector 403 can use auto-correlation of the STF, based on one or more shift values, in order to detect a packet. Moreover, the packet detector 403 can detect whether the wireless device 202b is an addressee of the packet based on a pseudo-random spreading code of the STF (such as a Walsh code or Hadamard code). For example, the wireless device 202b can be assigned an individual or group-based code index. In an embodiment, the code index can be a function of an association identifier (AID). The packet detector 403 can determine whether the STF is spread with a pseudo-random code associated with the assigned code index. For example, the packet detector 403 can include a cross-correlator, which can multiply the base STF with the sequence corresponding to the assigned code index.

In an embodiment, the packet detector 403 can control one or more components of the wireless device 202b to stop decoding the incoming packet when it detects that the wireless device 202b is not an addressee of the packet. For example, if the packet detector 403 determines that the STF of the incoming packet is spread with a code not associated with the wireless device 202b, the wireless device 202b can stop decoding one or more subsequent portions of the packet. In an embodiment, one or more components of the wireless device 202b, such as the DSP 220 and/or the receiver 212, can transition to a low-power state when the packet detector 403 determines that wireless device 202b is not an addressee of the packet. In various aspects, the packet detector 403 can be implemented by the processor 204, the DSP 220, the signal detector 218, or other hardware or software.

In various embodiments, the packet detector 403 can be configured to detect differentially encoded packets based on a packet previously received or transmitted. For example, in an embodiment, the wireless device 202b can send a first probe packet to the AP 104. In response to the first probe packet, the AP 104 can send a differentially encoded packet to the wireless device 202b. In an embodiment, the packet detector 403 can determine when the incoming packet is in response to the first probe packet, and can control the wireless device 202b to decode the packet as a differentially encoded packet accordingly.

In another embodiment, the packet detector 403 can be configured to detect differentially encoded packets based on a pseudo-random spreading code of the STF (such as a Walsh code or Hadamard code). For example, differentially encoded packets can be assigned one or more first spreading codes, and non-differentially encoded packets can be assigned one or more second spreading codes. The packet detector 403 can determine whether the STF is spread with a pseudo-random code associated with a differentially encoded or non-differentially encoded packet. For example, the packet detector 403 can include a cross-correlator, which can multiply the base STF with the sequence corresponding to a differentially encoded packet.

In another embodiment, the packet detector 403 can be configured to detect differentially encoded packets based on a detection state of a long training field (LTF). For example, wireless device 202 can include an LTF detector (not shown). In an embodiment, the packet detector 403 can include the LTF detector. In an embodiment, differentially encoded packets can include one or more differentially encoded portions following an STF and may not include an LTF. Non-differentially encoded packets can include an LTF. The differentially encoded portions can have an orthogonal property with respect to the LTF. The LTF detector can be configured to trigger on properly formed LTFs. Accordingly, the LTF detector can trigger on non-differentially encoded packets and may not trigger on differentially encoded packets. The packet detector 403 can determine that an incoming packet is differentially encoded based on the LTF detector.

In another embodiment, the packet detector 403 can be configured to detect differentially encoded packets based on a detection state of differentially encoded data. For example, wireless device 202 can include a differentially encoded data detector (not shown). In an embodiment, the packet detector 403 can include the differentially encoded data detector. In an embodiment, differentially encoded packets can include one or more differentially encoded portions following an STF and may not include an LTF. Non-differentially encoded packets can include an LTF. The differentially encoded portions can have an orthogonal property with respect to the LTF. The differentially encoded data detector can be configured to trigger on differentially encoded data. Accordingly, the differentially encoded data detector can trigger on differentially encoded packets and may not trigger on non-differentially encoded packets. The packet detector 403 can determine that an incoming packet is differentially encoded based on the differentially encoded data detector.

In an embodiment, the packet detector 403 can control one or more components of the wireless device 202b to stop decoding the incoming packet when it detects that the incoming packet includes one or more differentially encoded portions. For example, if the packet detector 403 determines that the STF of the incoming packet is spread with a code not associated with differentially encoded packets, the wireless device 202b can stop decoding one or more subsequent portions of the packet. As another example, if the packet detector 403 determines that the incoming packet triggers an LTF detector, the wireless device 202b can stop decoding one or more subsequent portions of the packet. As another example, if the packet detector 403 determines that the incoming packet triggers a differentially encoded data detector, the wireless device 202b can stop decoding one or more subsequent portions of the packet. In an embodiment, one or more components of the wireless device 202b, such as the DSP 220 and/or the receiver 212, can transition to a low-power state when the packet detector 403 determines that the incoming packet is differentially encoded. In various aspects, the packet detector 403 can be implemented by the processor 204, the DSP 220, the signal detector 218, or other hardware or software.

The wireless device 202b can further include a transform module 404 configured to convert the representation the wireless signal into a frequency spectrum. In FIG. 4, the transform module 404 is illustrated as being implemented by a fast Fourier transform (FFT) module. The transform module 404 can be programmable, and can be configured to perform FFT with different configurations based on a signal received from the packet detector 403. In one aspect, for example, the transform module 404 can be configured to perform either a 32-point FFT or a 64-point FFT based on an FFT mode received from the packet detector 403. In some aspects, the transform module can identify a symbol for each point that it uses.

The wireless device 202b can further include a channel estimator and equalizer 405 configured to form an estimate of the channel over which the data unit is received, and to remove certain effects of the channel based on the channel estimate. For example, the channel estimator can be configured to approximate a function of the channel, and the channel equalizer can be configured to apply an inverse of that function to the data in the frequency spectrum.

In some aspects, the channel estimator and equalizer 405 uses information in one or more received training fields, such as an LTF for example, to estimate the channel. The channel estimate can be formed based on one or more LTFs received at the beginning of the data unit. This channel estimate can thereafter be used to equalize data symbols that follow the one or more LTFs. After a certain period of time or after a certain number of data symbols, one or more additional LTFs can be received in the data unit. The channel estimate can be updated or a new estimate formed using the additional LTFs. This new or update channel estimate can be used to equalize data symbols that follow the additional LTFs. In some aspects, the new or updated channel estimate is used to re-equalize data symbols preceding the additional LTFs. Those having ordinary skill in the art will understand methods for forming a channel estimate.

The wireless device 202b can further include a demodulator 406 configured to demodulate the equalized data. For example, the demodulator 406 can determine a plurality of bits from symbols output by the transform module 404 and the channel estimator and equalizer 405, for example by reversing a mapping of bits to a symbol in a constellation. The bits can be processed or evaluated by the processor 204, or used to display or otherwise output information to the user interface 222. In this way, data and/or information can be decoded. In some aspects, the bits correspond to codewords. In one aspect, the demodulator 406 includes a QAM (quadrature amplitude modulation) demodulator, for example a 16-QAM demodulator or a 64-QAM demodulator. In other aspects, the demodulator 406 includes a binary phase-shift keying (BPSK) demodulator or a quadrature phase-shift keying (QPSK) demodulator.

In FIG. 4, the transform module 404, the channel estimator and equalizer 405, and the demodulator 406 are illustrated as being implemented in the DSP 220. In some aspects, however, one or more of the transform module 404, the channel estimator and equalizer 405, and the demodulator 406 are implemented in the processor 204 or in another element of the wireless device 202.

As discussed above, the wireless signal received at the receiver 212 includes one or more data units. Using the functions or components described above, the data units or data symbols therein can be decoded evaluated or otherwise evaluated or processed. For example, the processor 204 and/or the DSP 220 can be used to decode data symbols in the data units using the transform module 404, the channel estimator and equalizer 405, and the demodulator 406.

Data units exchanged by the AP 104 and the STA 106 can include control information or data, as discussed above. At the physical (PHY) layer, these data units can be referred to as physical layer protocol data units (PPDUs). In some aspects, a PPDU can be referred to as a packet or physical layer packet. Each PPDU can include a preamble and a payload. The preamble can include training fields and a SIG field. The payload can include a Media Access Control (MAC) header or data for other layers, and/or user data, for example. The payload can be transmitted using one or more data symbols.

FIG. 5A illustrates an example of a data unit 500. The data unit 500 can include a PPDU for use with the wireless device 202. The data unit 500 can be used by legacy devices or devices implementing a legacy standard or downclocked version thereof.

The data unit 500 includes a preamble 510. The preamble 510 can include a variable number of repeating STF 512 symbols, and one or more LTF 514 symbols. In one implementation, 10 repeated STF 512 symbols can be set followed by two LTF 512 symbols. The STF 512 can be used by the receiver 212 to perform automatic gain control to adjust the gain of the receive amplifier 401, as discussed above. Furthermore, the STF 512 sequence can be used by the receiver 212 for packet detection (for example, by the packet detector 403), rough timing, and other settings. The LTF 514 can be used by the channel estimator and equalizer 405 to form an estimate of the channel over which the data unit 500 is received.

In an embodiment, the STF 512 symbols can be encoded with a pseudo-random spreading code, such as a Walsh code or Hadamard code. The pseudo-random spreading code can be associated with a code index. Code indices can be associated with individual STAs 106 or groups of STAs 106. The AP 104 can encode the STF 512 symbols of the data unit 500 with the code index of the addressee of the data unit 500. The STAs 106 can determine whether they are an addressee of the data unit 500 based on the code index of the STF 512 symbols. Accordingly, STAs 106 that are not addressees can stop decoding the data unit 500 and/or transition one or more components to a low-power state. In some embodiments, the STFs 512 are encoded with a pseudo-random spreading code, whereas the LTFs 514 are not encoded with a pseudo-random spreading code. In some embodiments, the STFs 512 are shorter than the LTFs 514. In some embodiments, the STFs 512 precede the LTFs 514. In some embodiments, the STFs 512 can be referred to as a first type of training field, or first training fields. In some embodiments, the LTFs 514 can be referred to as a second type of training field, or second training fields.

Following the preamble 510 in the data unit 500 is a SIGNAL unit 520. The SIGNAL can be one OFDM signal that includes various information relating to the transmission rate, the length of the data unit 500, and the like. The data unit 500 additionally includes a variable number of data symbols 530, such as OFDM data symbols.

When the data unit 500 is received at the wireless device 202b, the size of the data unit 500 including the training symbols 514 can be computed based on the SIGNAL field 520, and the STF 512 can be used by the receiver 212 to adjust the gain of the receive amplifier 401. Further, a LTF 514a can be used by the channel estimator and equalizer 405 to form an estimate of the channel over which the data unit 500 is received. The channel estimate can be used by the processor 220 to decode the plurality of data symbols 522 that follow the preamble 510.

The data unit 500 illustrated in FIG. 5A is only an example of a data unit that can be used in the system 100 and/or with the wireless device 202. Those having ordinary skill in the art will appreciate that a greater or fewer number of the STFs 412 or LTFs 514 and/or the data symbols 530 can be included in the data unit 500. In addition, one or more symbols or fields can be included in the data unit 500 that are not illustrated in FIG. 5A, and one or more of the illustrated fields or symbols can be omitted.

FIG. 5B illustrates an example of another data unit 550. The data unit 550 can include a PPDU for use with the wireless device 202. The data unit 550 can be a differentially encoded packet. For example, the data unit 550 can be a control packet such as an ACK. The data unit 550 can be used by legacy devices or devices implementing a legacy standard or downclocked version thereof.

The data unit 550 includes a preamble 510. The preamble 510 can include a variable number of repeating STF 512 symbols, and may not include an LTF. In one implementation, 10 repeated STF 512 symbols can be followed by one or more differentially encoded symbols 560. The STF 512 can be used by the receiver 212 to perform automatic gain control to adjust the gain of the receive amplifier 401, as discussed above. Furthermore, the STF 512 sequence can be used by the receiver 212 for packet detection (for example, by the packet detector 403), rough timing, and other settings. The LTF 514 can be used by the channel estimator and equalizer 405 to form an estimate of the channel over which the data unit 550 is received.

In an embodiment, the STF 512 symbols can be encoded with a pseudo-random spreading code, such as a Walsh code or Hadamard code. The pseudo-random spreading code can be associated with a packet types such as differentially encoded packets and non-differentially encoded packets. The AP 104 can encode the STF 512 symbols of the data unit 550 with a spreading code based on whether the data unit 550 is differentially encoded. The STAs 106 can determine whether the data unit 550 is differentially encoded based on the spreading code of the STF 512 symbols. Accordingly, STAs 106 that receive differentially encoded packets can stop decoding the data unit 550 and/or transition one or more components to a low-power state without decoding a longer packet such as the data unit 500 (FIG. 5A).

Following the preamble 510 in the data unit 550 is a variable number of differentially encoded data symbols 560, such as OFDM data symbols. In an embodiment, the number of differentially encoded data symbols 560 is less than the number of data symbols 530 shown in FIG. 5A. In various embodiments, the data unit 550 can also include the SIGNAL unit 520. The SIGNAL unit 520 can be included in the differentially encoded data symbols 560 or can be non-differentially encoded.

The data unit 550 illustrated in FIG. 5B is only an example of a data unit that can be used in the system 100 and/or with the wireless device 202. Those having ordinary skill in the art will appreciate that a greater or fewer number of the STFs 412 and/or the differentially encoded data symbols 560 can be included in the data unit 550. In addition, one or more symbols or fields can be included in the data unit 550 that are not illustrated in FIG. 5B, and one or more of the illustrated fields or symbols can be omitted.

Pseudo-Random Spreading Codes for Short Training Fields

Figure 6:
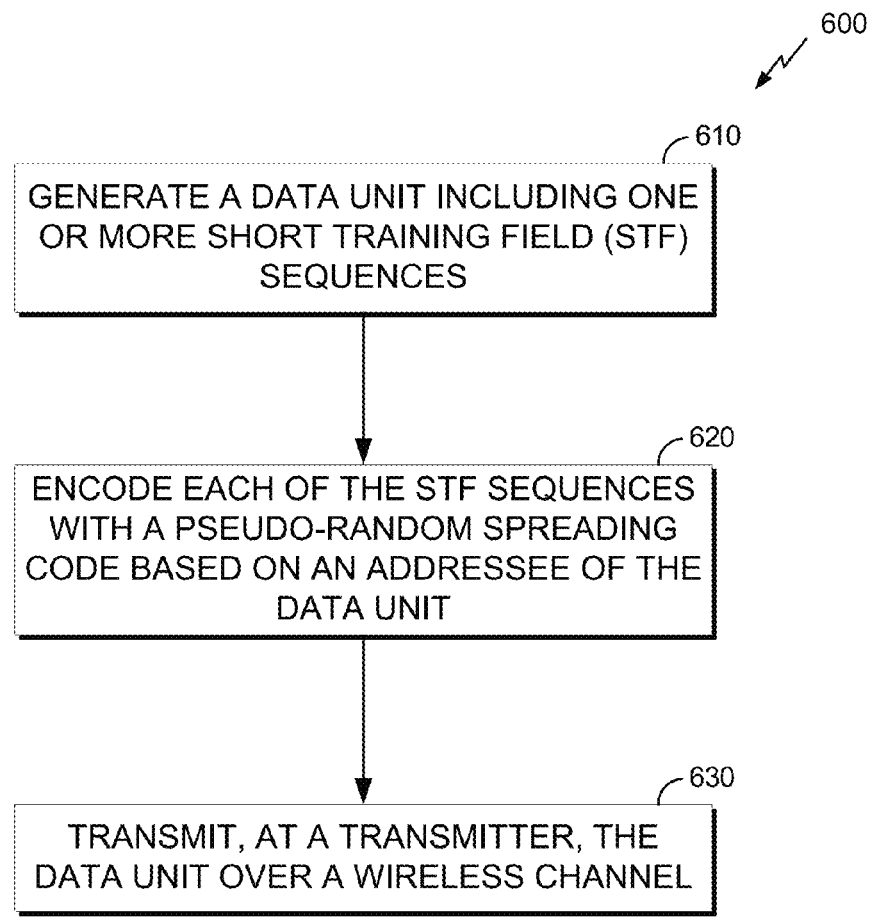
FIG. 6 shows a flowchart of an aspect of an exemplary method of generating and transmitting a data unit.

FIG. 6 shows a flowchart 600 of an aspect of an exemplary method of generating and transmitting a data unit. The method can be used to generate any of the data units 500 and 550 and STF sequences 512 described above with respect to FIGS. 5A and 5B. The data units 500 and 550 can be generated at either the AP 104 or the STA 106 and transmitted to another node in the wireless network 100. Although the flowchart 600 is described below with respect to elements of the wireless device 202a, those having ordinary skill in the art will appreciate that other components can be used to implement one or more of the steps described herein. Moreover, although the various blocks of the flowchart 600 are described herein in a particular order, the blocks can be reordered, additional blocks can be inserted, and/or one or more blocks can be removed within the scope of this disclosure.

First, at block 610, the DSP 220 generates a data unit 500 including one or more short training field (STF) sequences 512. Next, at block 620, the DSP 220 encodes each of the STF sequences 512 with a pseudo-random spreading code based on an addressee of the data unit. In an embodiment, the pseudo-random spreading code can include a Hadamard or Walsh code. In an embodiment, the pseudo-random spreading code can be associated with a single receiver. In another embodiment, the pseudo-random spreading code can be associated with a group of receivers that includes the addressee. In an embodiment, the pseudo-random spreading code can be based on an association identifier (AID). Then, at block 630, the transmitter 210 transmits the data unit over a wireless channel. The transmitter 210 can transmit the data unit 500 to, for example, a STA 106.

Figure 7:
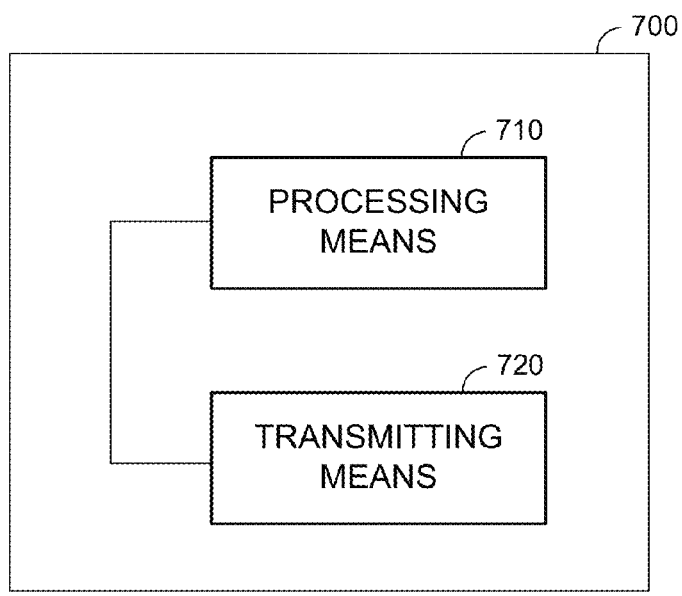
FIG. 7 is a functional block diagram of an exemplary wireless device that can be employed within the wireless communication system of FIG. 1.

FIG. 7 is a functional block diagram of an exemplary wireless device 700 that can be employed within the wireless communication system 100 of FIG. 1. The device 700 includes a processing means 710 and a transmitting means 720. In an embodiment, the processing means 710 can be configured to perform one or more of the functions discussed above with respect to the blocks 610 and/or 620 illustrated in FIG. 6. The processing means 710 can correspond to one or more of the processor 204, the DSP 220, and the transmitter 210.

The device 700 further includes a transmitting means 720. In an embodiment, the transmitting means 720 can be configured to perform one or more of the functions discussed above with respect to the block 630 illustrated in FIG. 6. The transmitting means 720 can correspond to one or more of the transmitter 210, the transceiver 214, and the antenna 216.

Figure 8:
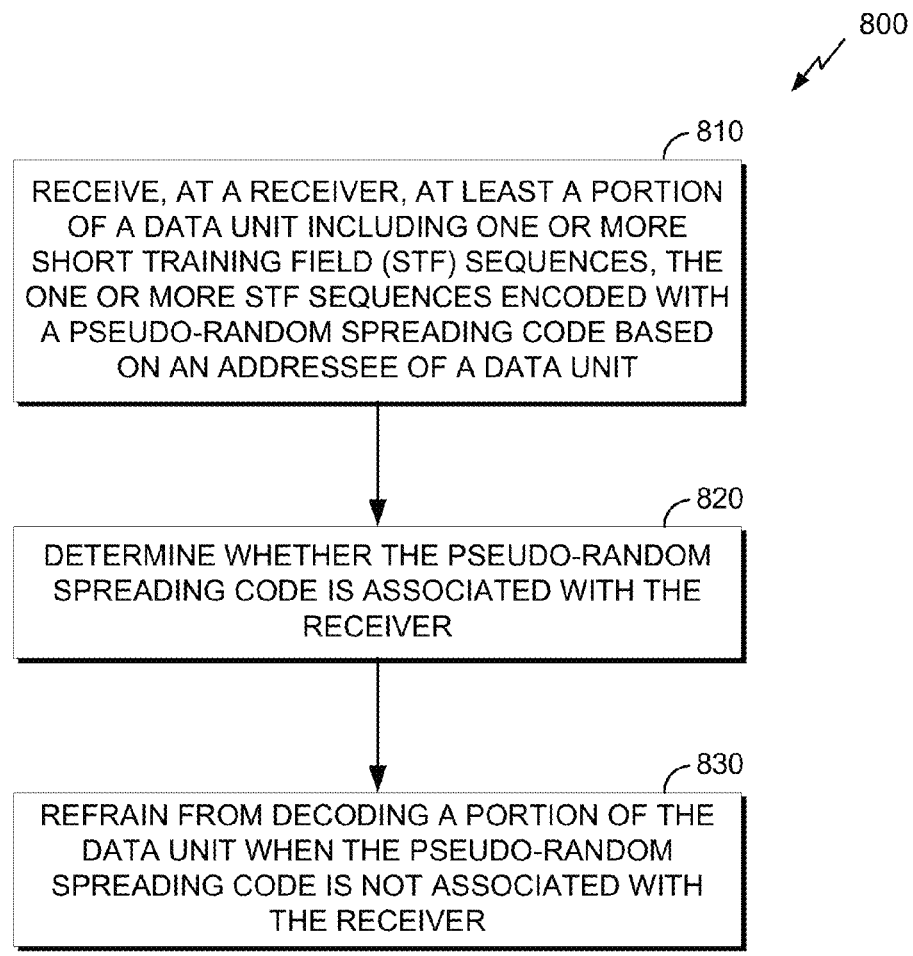
FIG. 8 shows a flowchart of an aspect of an exemplary method of receiving a data unit.

FIG. 8 shows a flowchart 800 of an aspect of an exemplary method of receiving a data unit. The method can be used to receive any of the data units 500 and 550 and STF sequences 512 described above with respect to FIGS. 5A and 5B. The data units 500 and 550 can be generated at either the AP 104 or the STA 106 and transmitted to another node in the wireless network 100. Although the flowchart 800 is described below with respect to elements of the wireless device 202b, those having ordinary skill in the art will appreciate that other components can be used to implement one or more of the steps described herein. Moreover, although the various blocks of the flowchart 800 are described herein in a particular order, the blocks can be reordered, additional blocks can be inserted, and/or one or more blocks can be removed within the scope of this disclosure.

First, at block 810, the receiver 212 receives at least a portion of a data unit 500. The data unit 500 can include one or more short training field (STF) sequences 512. The one or more STF sequences 512 can be encoded with a pseudo-random spreading code based on an addressee of a data unit. In an embodiment, the pseudo-random spreading code can include a Hadamard or Walsh code. In an embodiment, the pseudo-random spreading code can be associated with a single receiver. In another embodiment, the pseudo-random spreading code can be associated with a group of receivers that includes the addressee. In an embodiment, the pseudo-random spreading code can be based on an association identifier (AID).

Next, at block 820, the processor 204 determines whether the pseudo-random spreading code is associated with the receiver 212. In an embodiment, the packet detector 403 (FIG. 4) can determine whether the pseudo-random spreading code is associated with the wireless device 202b. For example, the packet detector 403 can cross-correlate the received STFs 512 with a reference STF.

Then, at block 830, the DSP 220 refrains from decoding a portion of the data unit 500 when the pseudo-random spreading code is not associated with the receiver 212. In an embodiment, the wireless device 202b can refrain from decoding one or more of the LTFs 514, the SIGNAL field 520, and the data symbols 530 when it determines that the data unit 500 is not intended for the wireless device 202b. In an embodiment, the wireless device 202b can transition on or more components into a low-power state.

Figure 9:
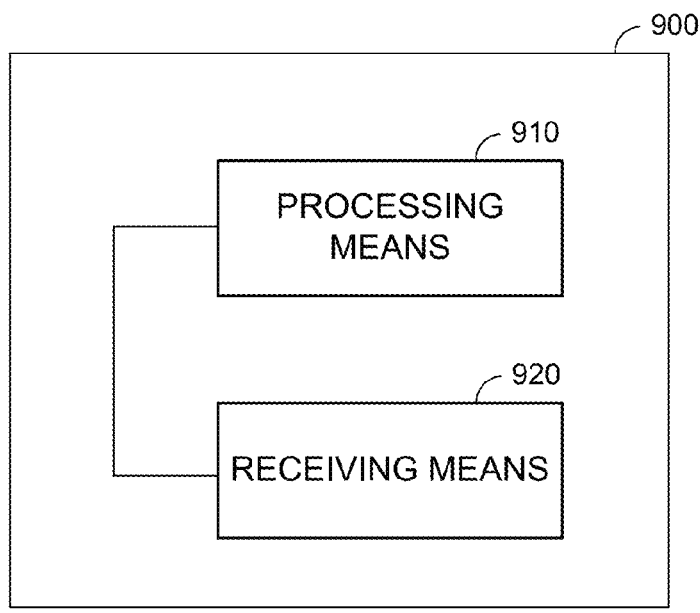
FIG. 9 is a functional block diagram of another exemplary wireless device that can be employed within the wireless communication system of FIG. 1.

FIG. 9 is a functional block diagram of an exemplary wireless device 900 that can be employed within the wireless communication system 100 of FIG. 1. The device 900 includes a processing means 910 and a receiving means 920. In an embodiment, the processing means 910 can be configured to perform one or more of the functions discussed above with respect to the blocks 820 and/or 830 illustrated in FIG. 8. The processing means 910 can correspond to one or more of the processor 204, the DSP 220, and the receiver 212.

The device 900 further includes a receiving means 920. In an embodiment, the receiving means 920 can be configured to perform one or more of the functions discussed above with respect to the block 810 illustrated in FIG. 8. The receiving means 920 can correspond to one or more of the receiver 212, the transceiver 214, and the antenna 216.

Differentially Encoded Packets

Figure 10:
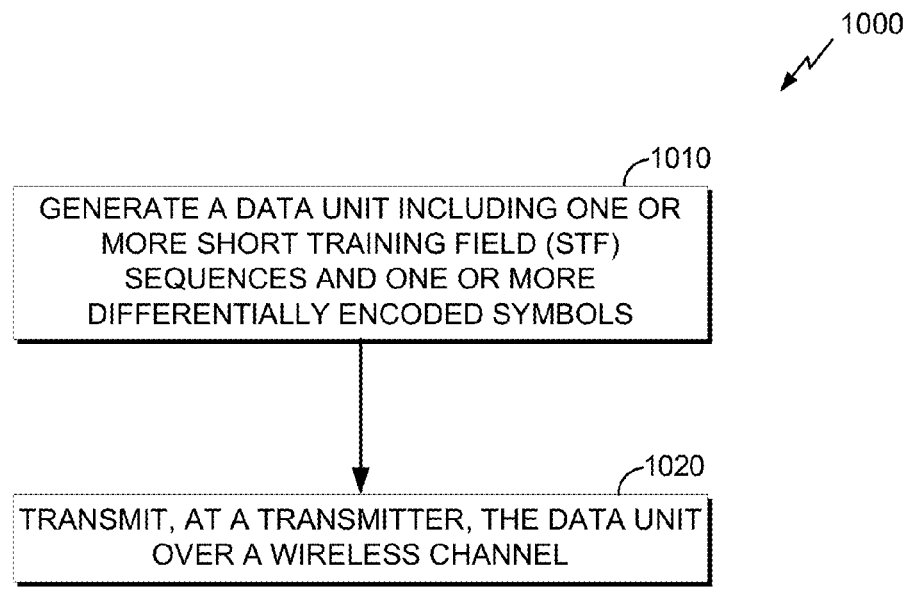
FIG. 10 shows a flowchart of an aspect of another exemplary method of generating and transmitting a data unit.

FIG. 10 shows a flowchart 1000 of an aspect of another exemplary method of generating and transmitting a data unit. The method can be used to generate any of the data units 550 and 550 and STF sequences 512 described above with respect to FIGS. 5A and 5B. The data units 550 and 550 can be generated at either the AP 104 or the STA 106 and transmitted to another node in the wireless network 100. Although the flowchart 1000 is described below with respect to elements of the wireless device 202a, those having ordinary skill in the art will appreciate that other components can be used to implement one or more of the steps described herein. Moreover, although the various blocks of the flowchart 1000 are described herein in a particular order, the blocks can be reordered, additional blocks can be inserted, and/or one or more blocks can be removed within the scope of this disclosure.

First, at block 1010, the DSP 220 generates a data unit 550. The data unit 550 includes one or more short training field (STF) sequences 512 and one or more differentially encoded symbols 560. In an embodiment, the data unit 550 can be a control packet. For example, the data unit 550 can be an acknowledgement ACK packet. In an embodiment, the data unit 550 may not use channel estimation. Accordingly, an LTF 514 can be omitted from the data unit 550.

In an embodiment, the wireless device 202a can be configured to transmit another, non-differentially encoded data unit 500. The non-differentially encoded data unit 500 can include additional fields such as, for example, one or more LTF sequences 514. In various embodiments, the wireless device 202a can include one or more indications that the data unit 550 is differentially encoded. In an embodiment, the DSP 220 encodes each of the STF sequences 512 with a pseudo-random spreading code indicative of a differentially encoded packet. In an embodiment, the pseudo-random spreading code can include a Hadamard or Walsh code.

In another embodiment, the receiver 212 can receive a first probe packet from a wireless device 202b. The receiver 212 can transmit the differentially encoded data unit 550 to the wireless device 202b in response to the first probe packet. The wireless device 202b can determine that the data unit 550 is differentially encoded because the wireless device 202a sends the data unit 550 in response to the first probe packet.

In another embodiment, the DSP 220 can encode the differentially encoded symbols 560 orthogonally with respect to a long training field (LTF) encoding. For example, the DSP 220 can encode the differentially encoded symbols 560 orthogonally in the time domain or the frequency domain.

Then, at block 1020, the transmitter 210 transmits the data unit over a wireless channel. The transmitter 210 can transmit the data unit 550 to, for example, a STA 106.

Figure 11:
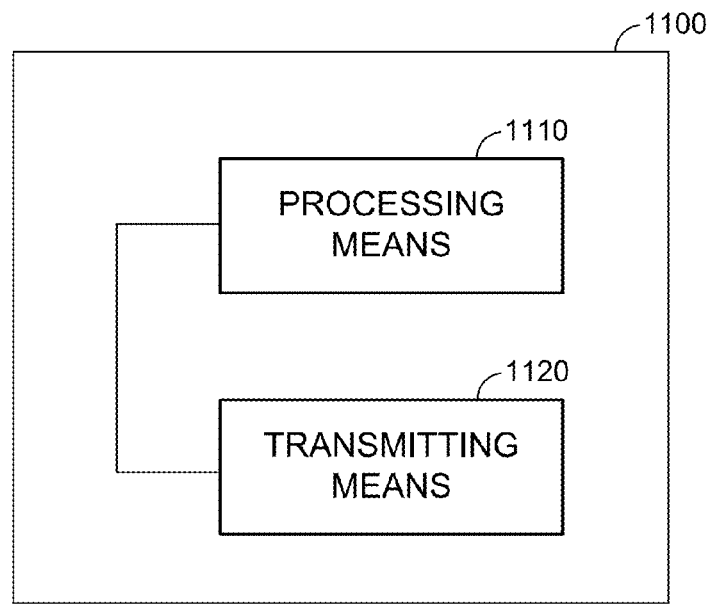
FIG. 11 is a functional block diagram of another exemplary wireless device that can be employed within the wireless communication system of FIG. 1.

FIG. 11 is a functional block diagram of an exemplary wireless device 1100 that can be employed within the wireless communication system 100 of FIG. 1. The device 1100 includes a processing means 1110 and a transmitting means 1120. In an embodiment, the processing means 1110 can be configured to perform one or more of the functions discussed above with respect to the block 1010 illustrated in FIG. 10. The processing means 1110 can correspond to one or more of the processor 204, the DSP 220, and the transmitter 210.

The device 1100 further includes a transmitting means 1120. In an embodiment, the transmitting means 1120 can be configured to perform one or more of the functions discussed above with respect to the block 1020 illustrated in FIG. 10. The transmitting means 1120 can correspond to one or more of the transmitter 210, the transceiver 214, and the antenna 216.

Figure 12:
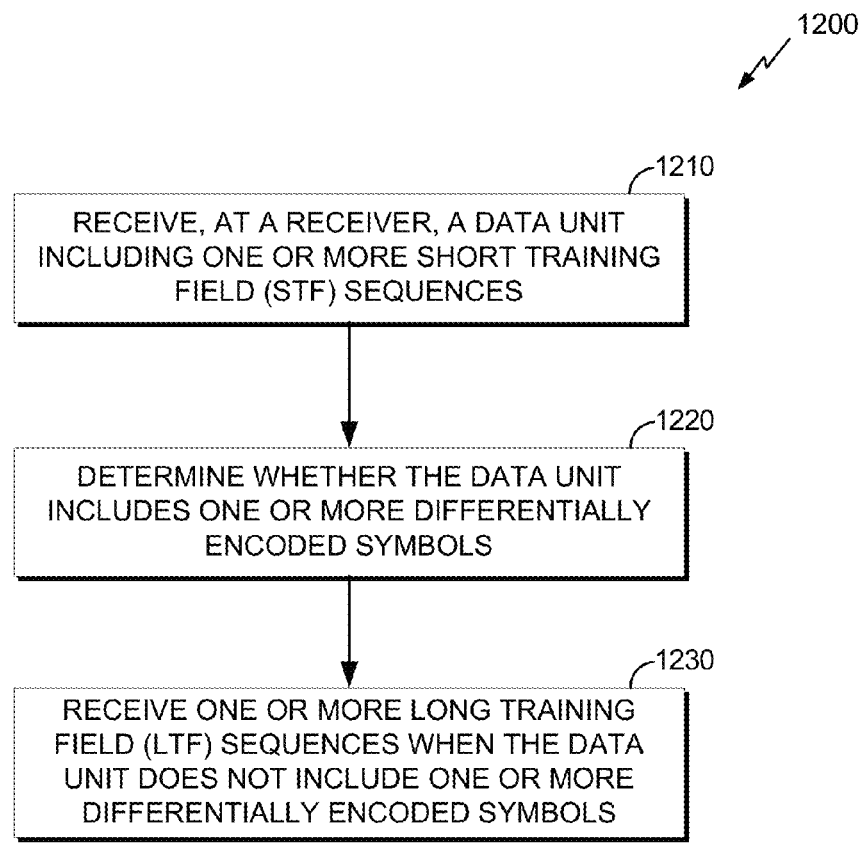
FIG. 12 shows a flowchart of an aspect of another exemplary method of receiving a data unit.

FIG. 12 shows a flowchart 1200 of an aspect of another exemplary method of receiving a data unit. The method can be used to receive any of the data units 550 and 550 and STF sequences 512 described above with respect to FIGS. 5A and 5B. The data units 550 and 550 can be generated at either the AP 104 or the STA 106 and transmitted to another node in the wireless network 100. Although the flowchart 1200 is described below with respect to elements of the wireless device 202b, those having ordinary skill in the art will appreciate that other components can be used to implement one or more of the steps described herein. Moreover, although the various blocks of the flowchart 1200 are described herein in a particular order, the blocks can be reordered, additional blocks can be inserted, and/or one or more blocks can be removed within the scope of this disclosure.

First, at block 1210, the receiver 212 receives a data unit 550. The data unit 550 can include one or more short training field (STF) sequences 512. In an embodiment, the data unit 550 can include one or more differentially encoded symbols 560. In an embodiment, the data unit 550 can be a control packet. For example, the data unit 550 can be an acknowledgement ACK packet. In an embodiment, the data unit 550 may not use channel estimation. Accordingly, an LTF 514 can be omitted from the data unit 550.

In an embodiment, the wireless device 202b can be configured to receive another, non-differentially encoded data unit 500. The non-differentially encoded data unit 500 can include additional fields such as, for example, one or more LTF sequences 514. In various embodiments, the wireless device 202b can receive one or more indications that the data unit 550 is differentially encoded. In an embodiment, each of the STF sequences 512 are encoded a pseudo-random spreading code indicative of a differentially encoded packet. In an embodiment, the pseudo-random spreading code can include a Hadamard or Walsh code.

In another embodiment, the transmitter 210 can transmit a first probe packet to an AP 104 such as the wireless device 202a. The receiver 212 can receive the differentially encoded data unit 550 from the wireless device 202a in response to the first probe packet. The wireless device 202b can determine that the data unit 550 is differentially encoded because the data unit 550 is received in response to the first probe packet.

In various embodiments, the packet detector 403 (FIG. 4) can determine whether the data unit 550 is differentially encoded by detecting differentially encoded data 560 or an LTF 514. The differentially encoded data symbols 560 can be encoded orthogonally with respect to a long training field (LTF) encoding. For example, differentially encoded symbols 560 can be orthogonal in the time domain or the frequency domain.

In an embodiment, the packet detector 403 can be configured to detect differentially encoded packets based on a detection state of a long training field (LTF). For example, wireless device 202b can include an LTF detector which can trigger on non-differentially encoded packets and may not trigger on differentially encoded packets. The packet detector 403 can determine that an incoming packet is differentially encoded based on the LTF detector.

In another embodiment, the packet detector 403 can be configured to detect differentially encoded packets based on a detection state of differentially encoded data. For example, wireless device 202 can include a differentially encoded data detector which can trigger on differentially encoded packets and may not trigger on non-differentially encoded packets. The packet detector 403 can determine that an incoming packet is differentially encoded based on the differentially encoded data detector.

Then, at block 1230, the receiver 212 receives one or more long training field (LTF) sequences when the data unit does not include one or more differentially encoded symbols. When the receiver 212 determines that the data unit is non-differentially encoded (for example, the data unit 500), the wireless device 202b processes additional fields after the STFs 512 such as, for example, the LTFs 514, the SIGNAL field 520, and/or the data symbols 530. On the other hand, when the receiver 212 determines that the data unit is differentially encoded (for example, the data unit 550), one or more of the LTFs 514, the SIGNAL field 520, and/or the data symbols 530 may not be present. Moreover, the differentially encoded data unit 550 can be shorter than the non-differentially encoded data unit 500. Accordingly, the receiver 212 can spend less time in the on-state when receiving the differentially encoded data unit 550.

Figure 13:
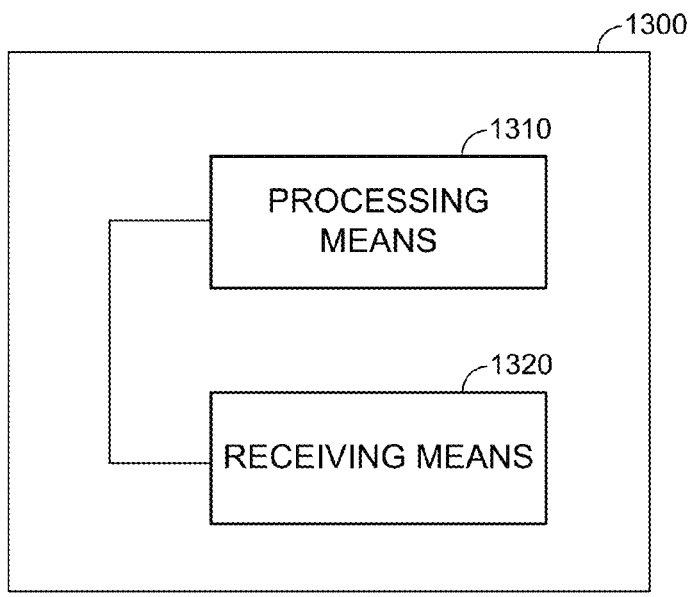
FIG. 13 is a functional block diagram of another exemplary wireless device that can be employed within the wireless communication system of FIG. 1.

FIG. 13 is a functional block diagram of an exemplary wireless device 1300 that can be employed within the wireless communication system 100 of FIG. 1. The device 1300 includes a processing means 1310 and a receiving means 1320. In an embodiment, the processing means 1310 can be configured to perform one or more of the functions discussed above with respect to the blocks 1220 and/or 1230 illustrated in FIG. 12. The processing means 1310 can correspond to one or more of the processor 204, the DSP 220, and the receiver 212.

The device 1300 further includes a receiving means 1320. In an embodiment, the receiving means 1320 can be configured to perform one or more of the functions discussed above with respect to the block 1210 illustrated in FIG. 12. The receiving means 1320 can correspond to one or more of the receiver 212, the transceiver 214, and the antenna 216.

As used herein, the term "determining" encompasses a wide variety of actions. For example, "determining" can include calculating, computing, processing, deriving, investigating, looking up (e.g., looking up in a table, a database or another data structure), ascertaining and the like. Also, "determining" can include receiving (e.g., receiving information), accessing (e.g., accessing data in a memory) and the like. Also, "determining" can include resolving, selecting, choosing, establishing and the like. Further, a "channel width" as used herein can encompass or can also be referred to as a bandwidth in certain aspects.

As used herein, a phrase referring to "at least one of" a list of items refers to any combination of those items, including single members. As an example, "at least one of: a, b, or c" is intended to cover: a, b, c, a-b, a-c, b-c, and a-b-c.

The various operations of methods described above can be performed by any suitable means capable of performing the operations, such as various hardware and/or software component(s), circuits, and/or module(s). Generally, any operations illustrated in the Figures can be performed by corresponding functional means capable of performing the operations.

The various illustrative logical blocks, modules and circuits described in connection with the present disclosure can be implemented or performed with a general purpose processor, a digital signal processor (DSP), an application specific integrated circuit (ASIC), a field programmable gate array signal (FPGA) or other programmable logic device (PLD), discrete gate or transistor logic, discrete hardware components or any combination thereof designed to perform the functions described herein. A general purpose processor can be a microprocessor, but in the alternative, the processor can be any commercially available processor, controller, microcontroller or state machine. A processor can also be implemented as a combination of computing devices, e.g., a combination of a DSP and a microprocessor, a plurality of microprocessors, one or more microprocessors in conjunction with a DSP core, or any other such configuration.

In one or more aspects, the functions described can be implemented in hardware, software, firmware, or any combination thereof. If implemented in software, the functions can be stored on or transmitted over as one or more instructions or code on a computer-readable medium. Computer-readable media includes both computer storage media and communication media including any medium that facilitates transfer of a computer program from one place to another. A storage media can be any available media that can be accessed by a computer. By way of example, and not limitation, such computer-readable media can include RAM, ROM, EEPROM, CD-ROM or other optical disk storage, magnetic disk storage or other magnetic storage devices, or any other medium that can be used to carry or store desired program code in the form of instructions or data structures and that can be accessed by a computer. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Disk and disc, as used herein, includes compact disc (CD), laser disc, optical disc, digital versatile disc (DVD), floppy disk and blu-ray disc where disks usually reproduce data magnetically, while discs reproduce data optically with lasers. Thus, in some aspects computer readable medium can include non-transitory computer readable medium (e.g., tangible media). In addition, in some aspects computer readable medium can include transitory computer readable medium (e.g., a signal). Combinations of the above should also be included within the scope of computer-readable media.

The methods disclosed herein include one or more steps or actions for achieving the described method. The method steps and/or actions can be interchanged with one another without departing from the scope of the claims. In other words, unless a specific order of steps or actions is specified, the order and/or use of specific steps and/or actions can be modified without departing from the scope of the claims.

The functions described can be implemented in hardware, software, firmware or any combination thereof. If implemented in software, the functions can be stored as one or more instructions on a computer-readable medium. A storage media can be any available media that can be accessed by a computer. By way of example, and not limitation, such computer-readable media can include RAM, ROM, EEPROM, CD-ROM or other optical disk storage, magnetic disk storage or other magnetic storage devices, or any other medium that can be used to carry or store desired program code in the form of instructions or data structures and that can be accessed by a computer. Disk and disc, as used herein, include compact disc (CD), laser disc, optical disc, digital versatile disc (DVD), floppy disk, and Blu-ray® disc where disks usually reproduce data magnetically, while discs reproduce data optically with lasers.

Thus, certain aspects can include a computer program product for performing the operations presented herein. For example, such a computer program product can include a computer readable medium having instructions stored (and/or encoded) thereon, the instructions being executable by one or more processors to perform the operations described herein. For certain aspects, the computer program product can include packaging material.

Software or instructions can also be transmitted over a transmission medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of transmission medium.

Further, it should be appreciated that modules and/or other appropriate means for performing the methods and techniques described herein can be downloaded and/or otherwise obtained by a user terminal and/or base station as applicable. For example, such a device can be coupled to a server to facilitate the transfer of means for performing the methods described herein. Alternatively, various methods described herein can be provided via storage means (e.g., RAM, ROM, a physical storage medium such as a compact disc (CD) or floppy disk, etc.), such that a user terminal and/or base station can obtain the various methods upon coupling or providing the storage means to the device. Moreover, any other suitable technique for providing the methods and techniques described herein to a device can be utilized.

It is to be understood that the claims are not limited to the precise configuration and components illustrated above. Various modifications, changes and variations can be made in the arrangement, operation and details of the methods and apparatus described above without departing from the scope of the claims.

While the foregoing is directed to aspects of the present disclosure, other and further aspects of the disclosure can be devised without departing from the basic scope thereof, and the scope thereof is determined by the claims that follow.

What is claimed is:

1. A method of wireless communication, comprising:
generating a data unit comprising one or more first training field sequences;
encoding with an encoder each of the first training field sequences with a pseudo-random spreading code, the pseudo-random spreading code being a function of an addressee of the data unit;
and transmitting, at a transmitter, the data unit over a wireless channel to a receiver that refrains from decoding with a decoder a portion of the data unit when the pseudo-random spreading code is not associated with the receiver.

2. The method of claim 1, wherein the pseudo-random spreading code comprises a Hadamard or Walsh code.

3. The method of claim 1, wherein the pseudo-random spreading code is associated with a single receiver.

4. The method of claim 1, wherein the pseudo-random spreading code is associated with a group of receivers comprising the addressee.

5. The method of claim 1, wherein the pseudo-random spreading code is based on an association identifier (AID).

6. A method of wireless communication, comprising:
receiving, at a receiver, at least a portion of a data unit comprising one or more first training field sequences, the one or more first training field sequences encoded with a pseudo-random spreading code, the pseudo-random spreading code being a function of an addressee of a data unit;
determining whether the pseudo-random spreading code is associated with the receiver; and
refraining from decoding with a decoder a portion of the data unit when the pseudo-random spreading code is not associated with the receiver.

7. The method of claim 6, wherein the pseudo-random spreading code comprises a Hadamard or Walsh code.

8. The method of claim 6, wherein the pseudo-random spreading code is associated with a single receiver.

9. The method of claim 6, wherein the pseudo-random spreading code is associated with a group of receivers comprising the addressee.

10. The method of claim 6, wherein the pseudo-random spreading code is based on an association identifier (AID).

11. The method of claim 6, wherein said determining comprises cross-correlating each first training field with a reference first training field.

12. The method of claim 6, wherein said refraining comprises transitioning one or more components of the receiver to a low-power state.

13. The method of claim 6, wherein said refraining comprises refraining from decoding one or more of a second training field, a signal (SIG) field, and a data payload.

14. A wireless device comprising:
a receiver configured to receive at least a portion of a data unit comprising one or more first training field sequences, the one or more first training field sequences encoded with a pseudo-random spreading code, the pseudo-random spreading code being a function of an addressee of a data unit; and
a processor configured to:
determine whether the pseudo-random spreading code is associated with the receiver; and
refrain from decoding with a decoder a portion of the data unit when the pseudo-random spreading code is not associated with the receiver.

15. The wireless device of claim 14, wherein the pseudo-random spreading code comprises a Hadamard or Walsh code.

16. The wireless device of claim 14, wherein the pseudo-random spreading code is associated with a single receiver.

17. The wireless device of claim 14, wherein the pseudo-random spreading code is associated with a group of receivers comprising the addressee.

18. The wireless device of claim 14, wherein the pseudo-random spreading code is based on an association identifier (AID).

19. The wireless device of claim 14, wherein said determining comprises cross-correlating each first training field with a reference first training field.

20. The wireless device of claim 14, wherein said refraining comprises transitioning one or more components of the receiver to a low-power state.

21. The wireless device of claim 14, wherein said refraining comprises refraining from decoding one or more of a second training field, a signal (SIG) field, and a data payload.

22. An apparatus for wireless communication comprising:
processing means for:
generating a data unit comprising one or more first training field sequences; and
encoding with an encoder each of the first training field sequences with a pseudo-random spreading code, the pseudo-random spreading code being a function of an addressee of the data unit; and
transmitting means for transmitting with a transmitter the data unit over a wireless channel to a receiver means that refrains from decoding with a decoder means a portion of the data unit when the pseudo-random spreading code is not associated with the receiver.

23. The apparatus of claim 22, wherein the pseudo-random spreading code comprises a Hadamard or Walsh code.

24. The apparatus of claim 22, wherein the pseudo-random spreading code is associated with a single receiver.

25. The apparatus of claim 22, wherein the pseudo-random spreading code is associated with a group of receivers comprising the addressee.

26. The apparatus of claim 22, wherein the pseudo-random spreading code is based on an association identifier (AID).

27. An apparatus for wireless communication comprising:
receiving means for receiving with a receiver at least a portion of a data unit comprising one or more first training field sequences, the one or more first training field sequences encoded with a pseudo-random spreading code, the pseudo-random spreading code being a function of an addressee of a data unit; and
processing means for:
determining whether the pseudo-random spreading code is associated with the receiver; and
refraining from decoding with a decoder a portion of the data unit when the pseudo-random spreading code is not associated with the receiver.

28. The apparatus of claim 27, wherein the pseudo-random spreading code comprises a Hadamard or Walsh code.

29. The apparatus of claim 27, wherein the pseudo-random spreading code is associated with a single receiver.

30. The apparatus of claim 27, wherein the pseudo-random spreading code is associated with a group of receivers comprising the addressee.

31. The apparatus of claim 27, wherein the pseudo-random spreading code is based on an association identifier (AID).

32. The apparatus of claim 27, the processing means further for cross-correlating each first training field with a reference first training field.

33. The apparatus of claim 27, the processing means further for transitioning one or more components of the receiver to a low-power state.

34. The apparatus of claim 27, the processing means further for refraining from decoding one or more of a second training field, a signal (SIG) field, and a data payload.

35. A non-transitory computer-readable medium comprising code that, when executed, causes an apparatus to:
generate a data unit comprising one or more first training field sequences;
encode with an encoder each of the first training field sequences with a pseudo-random spreading code, the pseudo-random spreading code being a function of an addressee of the data unit; and
transmit with a transmitter the data unit over a wireless channel to a receiver that refrains from decoding with a decoder a portion of the data unit when the pseudo-random spreading code is not associated with the receiver.

36. The medium of claim 35, wherein the pseudo-random spreading code comprises a Hadamard or Walsh code.

37. The medium of claim 35, wherein the pseudo-random spreading code is associated with a single receiver.

38. The medium of claim 35, wherein the pseudo-random spreading code is associated with a group of receivers comprising the addressee.

39. The medium of claim 35, wherein the pseudo-random spreading code is based on an association identifier (AID).

40. A non-transitory computer-readable medium comprising code that, when executed, causes an apparatus to:
receive with a receiver at least a portion of a data unit comprising one or more first training field sequences, the one or more first training field sequences encoded with a pseudo-random spreading code, the pseudo-random spreading code being a function of an addressee of a data unit;
determine whether the pseudo-random spreading code is associated with the apparatus; and
refrain from decoding with a decoder a portion of the data unit when the pseudo-random spreading code is not associated with the apparatus.

41. The medium of claim 40, wherein the pseudo-random spreading code comprises a Hadamard or Walsh code.

42. The medium of claim 40, wherein the pseudo-random spreading code is associated with a single receiver.

43. The medium of claim 40, wherein the pseudo-random spreading code is associated with a group of receivers comprising the addressee.

44. The medium of claim 40, wherein the pseudo-random spreading code is based on an association identifier (AID).

45. The medium of claim 40, further comprising code that, when executed, causes the apparatus to cross-correlate each first training field with a reference first training field.

46. The medium of claim 40, further comprising code that, when executed, causes the apparatus to transition one or more components of the apparatus to a low-power state.

47. The medium of claim 40, wherein said refraining comprises refraining from decoding one or more of a second training field, a signal (SIG) field, and a data payload.

* * * * *